United States Patent
Buetje et al.

(10) Patent No.: US 11,634,342 B2
(45) Date of Patent: Apr. 25, 2023

(54) IRON OXIDE PIGMENTS CONTAINING AL

(71) Applicant: LANXESS DEUTSCHLAND GMBH, Cologne (DE)

(72) Inventors: Kai Buetje, Duisburg (DE); Christine Kathrein, Duesseldorf (DE); Carsten Rosenhahn, Kempen (DE); Juergen Kischkewitz, Ratingen (DE); Ulrich Meisen, Kall (DE); Peter Koehler, Krefeld (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 17/700,428

(22) Filed: Mar. 21, 2022

(65) Prior Publication Data
US 2022/0259064 A1  Aug. 18, 2022

Related U.S. Application Data

(62) Division of application No. 16/498,511, filed as application No. PCT/EP2018/056863 on Mar. 19, 2018, now abandoned.

(30) Foreign Application Priority Data

Mar. 31, 2017 (EP) .................................... 17164231
Jul. 4, 2017 (EP) .................................... 17179589
Feb. 5, 2018 (EP) .................................... 18155087

(51) Int. Cl.
*C09C 1/24* (2006.01)
*C01G 49/00* (2006.01)

(52) U.S. Cl.
CPC ............ *C01G 49/0045* (2013.01); *C09C 1/24* (2013.01); *C01P 2006/13* (2013.01); *C01P 2006/63* (2013.01); *C01P 2006/64* (2013.01); *C01P 2006/65* (2013.01); *C01P 2006/80* (2013.01)

(58) Field of Classification Search
CPC . C01G 49/0045; C01G 49/06; C01P 2004/54; C01P 2006/12; C01P 2006/13; C01P 2006/63; C01P 2006/64; C01P 2006/65; C01P 2006/80; C08K 2003/2227; C08K 2003/2265; C08K 2201/006; C08K 3/013; C08K 3/22; C08K 9/02; C09C 1/24; C09D 1/00
See application file for complete search history.

(56) References Cited

PUBLICATIONS

I"nfluence of Al substitution on magnetism and adsorption properties of hematite" to Gao et al. Journal of Solid State Chemistry vol. 228, Aug. 2015, pp. 82-89 (Year: 2015).*

* cited by examiner

*Primary Examiner* — Shuangyi Abu Ali
(74) *Attorney, Agent, or Firm* — Nicanor A Kohncke; Christopher L. McDavid; Ewa M. Wozniak

(57) ABSTRACT

Aluminium-containing iron oxide pigments of the formula $Fe_{2-x}Al_xO_3$ with x values from 0.01 to 0.25, characterized in that they possess an a* value of 30.5 to 32.5 CIELAB units and a b* value of 25.5 to 30.5 CIELAB units, measured in each case as full shade in the alkyd resin according to DIN EN ISO 787-25:2007.

4 Claims, 1 Drawing Sheet

Fig. 1: Profile of the $C_{ab}*$ values in polyethylene (HD-PE) as a function of processing temperature

IRON OXIDE PIGMENTS CONTAINING AL

The invention relates to new Al-containing iron oxide pigments, to a process for producing them and to their use for the colouring of pastes, paints, plastics, paper and building materials.

PRIOR ART

High-grade red iron oxide pigments which represent the state of the art are customarily single-phase haematites having $Fe_2O_3$ contents of 96.5 wt % up to 99.5 wt %.

In the case of the direct red iron oxide pigments, up to 2.5 wt % of water is included, very largely bound within the haematite lattice, whereas the red pigments obtainable by calcining are free from water of crystallization and therefore have higher $Fe_2O_3$ contents.

Numerous processes corresponding to the prior art exist for producing these red pigments, with recent years having seen various measures allowing improvements to be achieved in terms of the pigment properties.

Processes possessing particular industrial significance are the Copperas, precipitation and Penniman processes and also the calcining of iron oxide precursors based on goethite and magnetite.

Important fields for use of these red pigments are inks and paints (solventborne, aqueous and powder coatings), plastics, and also paper and laminates, with levels of pigmentation of up to around 35 wt %.

For measuring the colour properties of red iron oxide pigments, there are long-established test methods, in which the colouredness of media coloured using red iron oxide pigments, such as test specimens of plastic or paint systems, is measured.

Standard parameters established for measuring the colouredness of red iron oxide pigments include the parameters of what is called the CIELAB colour space. In this system, every perceptible colour within this three-dimensional colour space is defined by the colour locus with the coordinates L* (lightness), a* (red-green value) and b* (yellow-blue value). The more positive an a* value, the greater the redness of the colour, and the more positive a b* value, the greater the yellowness of the colour. The colour blue, in contrast, becomes stronger as the b* value becomes more negative. In addition to these parameters, the saturation $C_{ab}^*$ (also called chroma, or chromaticity) is often also stated. This value is a direct product of the values a* and b* and represents the square root of the sum of the squares of a* and b*. The values a*, b*, L*, and $C_{ab}^*$ are dimensionless values which are commonly identified as "CIELAB units".

In the colorimetry of red iron oxide pigments, a test established for paint systems is the test in a long-oil alkyd resin (in accordance with DIN EN ISO 11664-4:2011-07 and DIN EN ISO 787-25:2007). A possible alkyd resin used was, formerly, Alkydal L 64 from Bayer. Since then, other, similar alkyd resins have been used, such as WorléeKyd P 151 from Worlée Chemie GmbH.

The corresponding colorimetry in plastics takes place, for example, in polyethylene (high-density polyethylene, HDPE) at a level of pigmentation of 1 wt %.

Moreover, a frequent requirement for the colouring of plastics is that the colour properties should change very little on exposure to the temperatures typically required when processing. An important criterion for assessment in this respect is the change in the saturation $C_{ab}^*$ relative to the original value.

One red pigment already long established on the market is the Copperas Red® R 1599D from Huntsman. The b* value of this product, in particular, however, is still in need of improvement. The same is also true, for example, of other red haematite pigments described in the prior art, such as those from WO 2016/038152 (see Table 1).

TABLE 1

Colour values in WorléeKyd P 151 (full shade, illuminant D65/10°)

| Red pigments as per prior art | a* | b* | Cab* | Al contents [%] |
|---|---|---|---|---|
| R1599 D (Huntsman) | 31.4 | 24.5 | 39.9 | — |
| Example 1 WO 2016/038152 | 31.1 | 24.7 | 39.6 | — |
| Example 3 DE 102004/024013 Al | 31.3 | 23.0 | 38.8 | 1.0 |
| Example 1 DE 2826941 Al | 30.2 | 23.0 | 38.0 | 0.95 |
| Example Fe:Al = 95:5 calcined at opt. T=700° C. from EP 1380542 | 28.1 | 22.9 | 36.3 | 1.7 |
| EP 187331, Example 7 analogous production | 27.7 | 19.9 | 34.1 | 1.3 |

Numerous attempts have already been undertaken in order to improve further these red pigments or to further improve their provision.

DE 3500470 (EP 187331), for example, attempted to use the precipitant MgO and a specific precipitation methodology in order to provide an Al-doped haematite having an improved hue (see Examples 7 and 8). While it did find a slight increase in the b* value (see Comparative Example B versus A), as a result of using MgO as against NaOH in the Al-free haematite, the absolute colour values found in DE'470 even for the Al-doped haematites were still in need of improvement, especially the b* values. In any case, the presence of magnesium leads to the formation of Mg ferrites, which do not have good coloristic qualities. A comparison of MgO and the variant addition described in EP'331 relative to the procedure of the present invention can be found in Comparative Example III of the present invention (for results see Table 1).

In EP 1380542 A1 as well, an attempt was made to adopt a pathway in order to provide improved red pigments. Thus, starting from an iron nitrate/aluminium nitrate solution and using organic compounds, a gel is produced which, after calcination, results in an Al-doped iron oxide which even at its optimum calcining temperature of 800° C. (see FIG. 4B) is still not very pure in colour, with an a* value of only 27.6 CIELAB units. In coloristic terms, moreover, this Al-doped pigment is also no improvement on the pure haematite, which at its optimum calcining temperature of 650° C. (see FIG. 4A) has a higher a* value of 29 CIELAB units all the same. Accordingly, even the pathway in EP'542 does not lead to the desired objective. In a reproduction of the pigment from EP'542 with an Fe:Al ratio of 95:5, the values in Table 1 were obtained at the optimum calcining temperature of 700° C. (see Comparative Experiment II of the present invention).

DE 2826941 likewise describes Al-containing red pigments which are obtained by the nitrobenzene reduction process; again, however, red pigments are obtained whose coloristic qualities are in need of improvement (cf. Table 1 below). They are produced by precipitation of an Al salt onto a magnetite precursor.

According to DE 102004/024013 A1, Al-containing red iron oxide pigments are produced by coating of finely divided goethite (α-FeOOH) precursors with aluminium compounds, with subsequent calcination. The reworking, for example, of Example 3 in that specification yielded Al-containing red iron oxide pigments whose colour properties, however, are still in need of improvement (Tab. 1).

OBJECTIVE

It was an object of the present invention, therefore, to provide red pigments which expand the colour space relative to the red iron oxide pigments in the prior art. These new pigments are preferably to possess a higher saturation $C_{ab}*$ as well and, in particular, an improved heat stability, in plastics, for example. It has been found that specific Al-containing iron oxide pigments achieve this object.

DESCRIPTION

Figure 1:
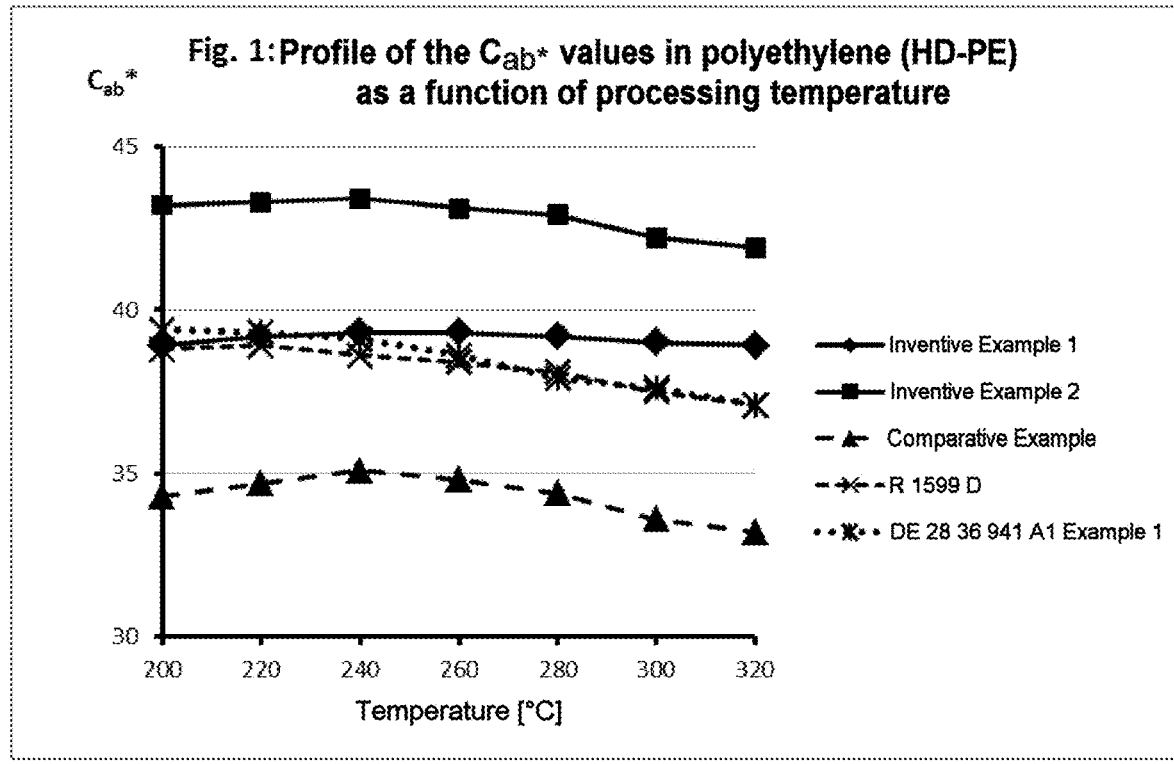
FIG. 1 shows a profile of the $C_{ab*}$ values in polyethylene (HD-PE) as a function of processing temperature.

The invention therefore relates to Al-containing iron oxide pigments of the formula $Fe_{2-x}Al_xO_3$ with x values from 0.01 to 0.25, characterized in that they possess an a* value of 30.5 to 32.5 CIELAB units and a b* value of 25.5 to 30.5 CIELAB units, measured in each case in the alkyd resin according to DIN EN ISO 787-25:2007 as full shade.

Colorimetry on the Al-containing iron oxides of the invention here takes place in a long-oil alkyd resin in accordance with DIN EN ISO 787-25:2007, preferably with the illuminant D65/10°, for example in WorléeKyd P 151 from Worlée Chemie GmbH.

The Al-containing iron oxide of the invention is preferably present in a haematite structure. In this case the aluminium is located preferably at the octahedral lattice sites in substitution of $Fe^{3+}$ ions.

Preferred Al-containing iron oxides have a saturation $C_{ab}*$ of 39.8 to 44.6 CIELAB units. $C_{ab}*$ here represents the square root of the sum of the squares of a* and b*, measured in the varnish system above.

The pigments of the invention preferably possess a heat stability measured in HDPE polyethylene at 1% pigmentation, determined according to DIN EN 12877-2 by a change ($\Delta C_{ab}*$) in the saturation ($C_{ab}*$) of less than 3 CIELAB units, preferably less than 1.5 CIELAB units, on temperature increase from 200 to 320° C.

In one preferred embodiment of the pigments of the invention, in the formula, the Al index x is a number from 0.01 to 0.10, more particularly from 0.025 to 0.075.

Likewise preferred are pigments of the invention in which, in the formula, the Al index x is a number from 0.11 to 0.25, more particularly from 0.12 to 0.15.

The pigments of the invention likewise preferably have a water content of less than 0.8 wt %, preferably of less than 0.5 wt %.

In a further preferred embodiment, the pigments of the invention have a chloride content of less than 0.1 wt %, preferably less than 0.01 wt %, based on the pigment.

The amount of manganese and chromium as well is preferably very small. The sum total of manganese and chromium is preferably less than 500 ppm, very preferably less than 100 ppm, based on the pigment.

For magnesium as well it is the case that its proportion is preferably very low. The amount of magnesium is preferably less than 500 ppm, very preferably less than 100 ppm, based on the pigment.

The pigments of the invention preferably have a specific surface area by the BET method of 6.5 to 12.5 $m^2/g$.

The pigments of the invention may also be coated. In that case they may have one or more coatings selected from organic and/or inorganic compounds.

Organic coating materials include, for example, polyhydric alcohols, polyethylene glycols, polypropylene glycols, their etherification products with monohydric alcohols and esterification products with carboxylic acids, and also silicone oils.

Suitable inorganic coating materials are preferably colourless oxides or hydroxides of Al, Si, Zr and Mg, especially $Al_2O_3$.

Where the pigments of the invention are coated, the coating materials are employed preferably in an amount of 0.01 to 3 wt %, based on the pigment.

Process

The invention further relates to a process for producing the pigments of the invention, comprising at least the steps of a) precipitation, b) oxidation and c) calcination, characterized in that:

a1) an aqueous solution comprising ions of iron, of sulfate and of aluminium, the molar ratio of iron ions to Al ions being 199:1 to 7:1, is reacted with an alkali metal hydroxide, such as NaOH, LiOH or KOH, more particularly NaOH, as alkaline compound, with the aqueous solution comprising ions of iron, of sulfate and of aluminium being metered into the initial charge of the alkaline compound, preferably in the form of its aqueous solution, or a2) an aqueous solution comprising ions of iron and of sulfate is reacted with an alkali metal hydroxide, such as NaOH, LiOH or KOH, more particularly NaOH, as alkaline compound, and with at least one aluminium compound, preferably alkali metal aluminate, more particularly sodium aluminate, with the molar ratio of iron in the solution to aluminium in the aluminium compound being 199:1 to 7:1 and with the alkaline compound being introduced as an initial charge with at least one aluminium compound, preferably an alkali metal aluminate solution, in particular in the form of an aqueous solution, and the aqueous solution comprising ions of iron and of sulfate being metered in, b) the aqueous suspension obtained after step a) is oxidized in the presence of an oxidizing agent, and c) the oxidation product obtained after b) is calcined at a temperature of 500 to 1100° C. in an oxidizing atmosphere.

The Fe:Al ratio of 199:1 to 7:1 here corresponds, in the target composition of $Fe_{2-x}Al_xO_3$, to an x value of 0.01 to 0.25.

Precipitation a1)

The aqueous solution comprising ions of iron, of sulfate and of aluminium can be obtained by mixing corresponding sulfate-containing iron salt solutions with solutions containing aluminium ions, which in turn may be obtained individually from corresponding iron precursors and aluminium compounds, respectively.

For example iron(II) sulfates for such iron sulfate solutions can be obtained from steel-pickling plants or from $TiO_2$ production by the sulfate process, or by dissolving metallic iron, iron carbonates, iron hydroxides or iron oxides in sulfuric acid.

For producing the pigments of the invention it is preferred to use very pure iron raw materials in the form of iron(II) sulfate solutions having a total iron content of 80 to 95 g/l and a sum content of manganese and chromium of less than 250 mg/l.

The solution used preferably also includes a magnesium content of less than 500, preferably less than 100 ppm, based on the solution.

Preferred for the precipitation according to step a) is an aqueous solution comprising ions of iron, of sulfate and aluminium in which the iron ions are present in the form of a mixture of iron(II) and iron(III) ions, preferably with an Fe(III) fraction of 5 to 30 mol %, more particularly 10 to 20 mol % Fe(III), based on the total amount of iron in the solution.

Setting the correspondingly preferred Fe(III) fractions in the respective iron(II)/(III) sulfate mixture can be done either by adding corresponding amounts of iron salts, preferably of iron(III) sulfate, or by partial oxidation of the iron salt solution, preferably the iron(II) sulfate solution, with—for example—atmospheric oxygen, preferably at temperatures of 80° C. or above, in particular at 80 to 100° C., or with $H_2O_2$ at temperatures preferably of 20 to 70° C.

Al components used in the aqueous solution comprising ions of iron, of sulfate and of aluminium may be aluminium salts such as, for example, chlorides, sulfates or else nitrates, particular preference being given to Al(III) sulfates.

The aqueous solution comprising ions of iron, of sulfate and of aluminium for step a1) preferably contains a molar ratio of iron in the form of Fe(II) and/or Fe(III) to Al ions of 79:1 to 26:1, preferably of 17.2:1 to 7:1, more particularly of 15.7:1 to 12.3:1. An Fe:Al ratio of 79:1 to 26:1 here corresponds, in the target composition $Fe_{2-x}Al_xO_3$, to an x value of 0.025 to 0.075; an Fe:Al ratio of 17.2:1 to 7:1 here corresponds to an x value of 0.11 to 0.25; and an Fe:Al ratio of 15.7:1 to 12.3:1 here corresponds to an x value of 0.12 to 0.15.

The aqueous solutions comprising ions of iron, of sulfate and of aluminium and used in accordance with the invention are provided preferably by mixing of the Fe(III)- and/or Fe(II)-containing sulfate solution and of corresponding Al-containing solutions.

The reaction in step a1) is preferably accomplished by heating the alkaline compound as precipitant in a suitable reaction vessel with stirrer, gasification container and electrical heating to the reaction temperature.

The reaction temperature is preferably 20 to 100° C., more particularly 80 to 100° C., more preferably 85 to 100° C.

The aqueous solution comprising ions of iron, of sulfate and of aluminium is metered into the initial charge of the alkaline compound, preferably in the form of its aqueous solution. This addition is preferably made at the reaction temperature.

The precipitation here takes place preferably at a pH of greater than 10, more particularly at a pH of 10.5 to 14.

The addition is made preferably with stirring. If a particular ratio of Fe(II) and Fe(III) has already been set in the aqueous solution comprising the ions of iron, of sulfate and of aluminium, it is preferred to allow the precipitation reaction to proceed under inert gas.

Optionally, however, the Fe(II)/(III) ratio may also be set only during the precipitation, by means of the above-described oxidation.

The amount of alkaline compound to be used for the precipitation is a product of the amounts of the iron ions and aluminium ions, preference being given to a molar ratio of $Fe_{total}$ to $OH^-$ of 0.45 to 0.55 and also of Al(III) to $OH^-$ of 0.33, and also, optionally, of free acid present that is to be neutralized—sulfuric acid, for example.

Precipitation a2)

In a further preferred embodiment of the invention, the procedure and the proportions of the iron ions to aluminium ions are fundamentally the same as in the case of the precipitation a1), with the difference being that the aluminium compound is not present in the iron(II)/(III) sulfate mixture but is instead introduced as an initial charge together with the alkaline compound serving as precipitant.

The aluminium compound is preferably, for example, an aqueous Na aluminate solution which is mixed with the alkaline precipitant in order then to furnish the soluble Al ions.

Suitable alkaline compounds serving as precipitant are those specified under a1).

The alkaline precipitant is preferably included as an initial charge mixed with an alkali metal aluminate solution, and the iron(II)/(III) sulfate mixture is metered into this initial charge.

Oxidation b)

The precipitation is followed by oxidation with an oxidizing agent. The oxidizing agent used is preferably an oxygen-containing gas, such as air, for example. This oxidation takes place preferably in the aqueous medium obtained after step a1) or a2), more particularly in the suspension obtained as a result of the precipitation. The oxidizing agent, more particularly the oxygen-containing gas, is preferably introduced into the aqueous medium obtained after step a1) or a2).

The oxidation according to step b) here takes place in particular at a temperature of 20 to 100° C., more particularly at 80 to 100° C., very preferably at 85 to 100° C.

The course of the oxidation and also the end of the oxidation step can be checked, for example, by an EMF measurement using a commercial redox electrode in the reaction vessel. The depletion of dissolved iron(II) ions in the reaction mixture is indicated by a jump in potential.

After oxidation has taken place, the pigment precursor, preferably the magnetite formed, is isolated by filtration and preferably washed, in particular until the filtrate conductivity is below 2000 µS/cm, preferably below 800 µS/cm, more preferably below 200 µS/cm. This is followed preferably by drying of the filter cake, in particular at a temperature of 30 to 250, preferably of 30 to 120° C.

Calcining c)

The production of the Al-containing iron oxide pigments of the invention with the composition $Fe_{2-x}Al_xO_3$ is accomplished by calcination of the oxidation product obtained after step b), preferably in the form of the isolated, washed and dried filter cake, also referred to as Al-containing magnetite, at a temperature of 500 to 1100° C., preferably of 600 to 975° C., preferably in the presence of an oxygen-containing gas, more particularly of air.

During the calcination according to step c) of the process of the invention, it should be borne in mind that the level of optimum calcining temperature is dependent on the Al content of the oxidation product obtained after step b). The optimum calcining temperature here is the temperature at which the maximum a* value (red fraction) has been obtained. This may be determined in a series of different calcining temperatures.

In order to improve further the coloristic properties and also the processing properties in binders and plastics, the pigments of the invention obtained after step c) may additionally be subjected to grinding and/or to coating.

In the case of an inorganic coating, it is preferred for coating to follow step c). Preferred inorganic coating materials that are suitable are preferably colourless oxides or hydroxides of Al, Si, Zr and Mg, especially $Al_2O_3$.

It is likewise preferred for the Al-containing iron oxides of the invention, with or without inorganic coating, to be subjected additionally to milling. Suitable milling methods are, for example, jet milling, pendulum milling or else wet milling operations.

In the course of milling, it is possible with preference to add organic coating materials, examples being polyhydric alcohols, polyethylene glycols, polypropylene glycols, their etherification products with monohydric alcohols and esterification products with carboxylic acids, and also silicone oils. These coating materials may likewise act as milling assistants.

The preferred quantities of coating materials for metered addition may be from 0.01 to 3 wt % in the case of inorganic coating materials and from 0.01 to 1 wt % in the case of organic coating materials. The sum total of organic and inorganic coating materials in this context is 0.01 to 3 wt %.

Use

The invention further relates to the use of the pigments of the invention for colouring pastes, paints, plastics, paper and building materials.

Measurement Methods

Testing of Full-Shade Colorimetric Values

The full-shade colorimetric values were determined according to DIN EN ISO 787-25:2007, using the test paste described below.

5 g of a thixotroped long-oil alkyd resin (WorléeKyd P 151) were applied to the bottom part of a plate paint dispersion machine (TFAM) with a plate diameter of 240 mm, and the red iron oxide pigment in question was processed with the test paste to form a coloured paste with a PVC (pigment volume concentration) of 10%.

The test paste contains 95 wt % of alkyd resin (Worléekyd P 151 from Worlée-Chemie GmbH, DE) and 5 wt % of Luvotix HAT thixotropic agent (Lehmann & Voss & Co KG, DE). The Luvotix is incorporated by stirring into the alkyd resin which has been preheated at 70 to 75° C., and the mixed paste is heated at 95° C. until dissolution has taken place. After cooling, the paste is rolled free of bubbles on a triple-roll mill.

The red pigments were weighed out according to $$m_P = \frac{PVC * m_b * \rho_p}{(100 - PVC) * \rho_b}$$

$m_P$=mass of red iron oxide pigment
PVC=pigment volume concentration
$m_b$=mass of binder
$\rho_p$=density of pigment
$\rho_b$=density of binder The completed paste was transferred to a paste plate and subjected to colorimetry on a Datacolor 600 colorimeter with the measuring geometry of d/8° and the illuminant D65/10° with gloss (CIELAB colour space according to DIN 5033 Part 7).

Determination of the Heat Stability of Red Iron Oxide Pigments in Polyethylene (High-Density Polyethylene, HD-PE)

The heat stability in polyethylene (HD-PE) was tested by DIN EN 12 877-2 according to method B in full shade.
HD-PE grade: DOW KT 10000 UE (pellets)

Processing Equipment

Schwabenthan Polytest 30 P single-screw extruder
Arburg 221 K-350-100 injection moulding machine

Colorimeter and Colorimetry

Datacolor 600
Measuring geometry d/8°
Illuminant D65/10° with gloss

Procedure 14 g of red iron oxide pigment were mulled with 1400 g of HD-PE pellets (1% pigmentation) in a polythene pouch in a PE drum for 20 minutes. The batch was subsequently extruded in the single-screw extruder at 180° C. and 60 rpm. These predispersed pellets (3 mm particle size) were converted in the above injection moulding machine into PE plaques with dimensions of 6*4 cm and a thickness of 3 mm. The start temperature was 200° C. (likewise reference for the heat stability $\Delta C_{ab}*$), and the temperature was raised in 20° C. steps up to 320° C.

EXAMPLES

Inventive Example 1

Conventional dissolution of metallic iron obtained electrolytically (commercial product of Allied Metals Corp.) and having an Mn and Cr content of <1 ppm in each case, in sulfuric acid (96 wt %, ultra-pure, diluted with water; commercial product from Bernd Kraft) was used to prepare an iron(II) sulfate solution having an $Fe^{2+}$ content of 92.15 g/l, an $Fe^{3+}$ content of 0.08 g/l, a free sulfuric acid content of 1.22 wt % and a pH of 0.9 (solution 1).

Dissolution of metallic iron obtained electrolytically (commercial product of Allied Metals Corp.) and having an Mn and Cr content of <1 ppm in each case, in ultra-pure sulfuric acid (commercial product from Bernd Kraft) was used to produce in the same way a second portion of iron(II) sulfate solution. 12 mol of $FeSO_4$ in the form of this solution were reacted with 12 mol of hydrogen peroxide in the form of 946 ml of a 35 wt % strength solution (commercial product from Merck) and with 5 mol of $H_2SO_4$ in the form of the aforementioned 96 wt % strength acid, the temperature rising from around 20 up to around 70°. This gave a predominantly iron(III)-containing sulfate solution with 64.6 g/l of $Fe^{3+}$, 11.15 g/l of $Fe^{2+}$ and 3.02 wt % of free sulfuric acid (solution 2).

By mixing 12.45 l (15.4 kg) of solution 1, 3.12 l (3.82 kg) of solution 2 and 396 ml (523 g) of $Al_2(SO_4)_3$ solution with an Al content of 4.3 wt % (commercial product of Feralco), an Fe(II)/Fe(III)/Al(III) sulfate mixture was produced which had a molar composition of 20.542 mol Fe(II), 3.625 mol Fe(III) and 0.833 mol Al(III) and a total volume of 16.0 l.

A 30 l stirring vessel equipped with gasifier, heater, stirrer and liquid metering facilities was charged with 7.17 l of aqueous sodium hydroxide solution (NaOH content 316 g/l) and this initial charge was heated to 90° C. with $N_2$ blanketing (80 l/h). The aforementioned Fe(II)/Fe(III)/Al (III) sulfate mixture was metered into this alkali solution at a uniform rate over the course of 45 minutes and at 90° C. with $N_2$ blanketing and stirring.

After the end of the precipitation reaction, oxidation took place at a temperature of 90° C. within a reaction time of 9.5 hours to form magnetite (oxidation product) by air introduction (about 40 l/h).

A compilation of the batch quantities for the production of the oxidation product is given in Table 2.

The aqueous suspensions of the oxidation products were filtered in a known way, washed to a filtrate conductivity <200 µS/cm and characterized as follows after drying of the filter cake at a temperature of 40° C.:

Specific surface area by BET method: 32.6 $m^2/g$
Fe content: 67.9 wt %
Al content: 1.0 wt %

The oxidation product thus isolated was calcined in a chamber kiln at the optimum calcining temperature of 775° C. (accuracy ±5° C.) in a residence time of 30 minutes under an oxidizing atmosphere (in the presence of air). To determine the optimum calcining temperature, a variety of temperatures were trialled (see Table 3). The inventive pigment obtained was characterized—as indicated in Table 4—and tested coloristically in WorléeKyd P 151 (full shade) (for colorimetric values see Table 5).

The same red pigment was processed in HD-PE and the heat stability was ascertained by measurement of the saturation $C_{ab}^*$ as a function of the processing temperature between 200 and 320° C. (see Table 6 and FIG. 1).

Inventive Example 2

The procedure in this example was as for Inventive Example 1, with the sulfate mixture having a molar composition of 19.833 mol Fe(II), 3.5 mol Fe(III) and 1.667 mol Al(III) and a total volume of 15.0 l. It was obtained by mixing 10.84 l (13.5 kg) of an iron(II) sulfate solution having an $Fe^{2+}$ content of 99.21 g/l and $Fe^{3+}$ content of 0.12 g/l and an $H_2SO_4$ content of 0.095 wt %; 3.03 l (3.705 kg) of solution 2 as in Inventive Example 1; and 1.1 l (1.36 kg) of an $Al_2(SO_4)_3$ solution having an Al content of 3.3 wt % (commercial product from Feralco). The initial charge was 7.39 l of aqueous sodium hydroxide solution having an NaOH content of 316 g/l.

The oxidation time was around 10.5 hours at 85° C.

A compilation of the batch quantities for the production of the oxidation product is given in Table 2.

The characterization of this oxidation product after drying yielded the following data:

Specific surface area by BET method: 35.8 $m^2/g$
Fe content: 65.2 wt %
Al content: 3.1 wt %

The oxidation product was calcined in a chamber kiln at the optimum calcining temperature of 900° C. (accuracy ±5° C.) in a residence time of 30 minutes under an oxidizing atmosphere. To determine the optimum calcining temperature, a variety of temperatures were trialled (see Table 3). The inventive pigment obtained was characterized—as indicated in Table 4—and tested coloristically in WorléeKyd P 151 (full shade) (for colorimetric values see Table 5).

The same red pigment was processed in HD-PE and, as described in Inventive Example 1, the heat stability was ascertained by measurement of the saturation $C_{ab}^*$ (see Table 6 and FIG. 1).

Comparative Example I

In this comparative example, an oxidation product without addition of Al was produced in accordance with the procedure of Inventive Example 1. The sulfate mixture in this case had a molar composition of 21.25 mol Fe(II) and 3.75 mol Fe(III) with a total volume of 16.3 l (see Table 2). It was obtained by mixing 13.79 l (16.93 kg) of an iron(II) sulfate solution having an $Fe^{2+}$ content of 86.07 g/l, an $Fe^{3+}$ content of 0.57 g/l and an $H_2SO_4$ content of 0.86 wt %, and also 2.49 l (3.12 kg) of an iron(III) sulfate solution having an $Fe^{3+}$ content of 84.12 g/l, an $Fe^{2+}$ content of 0.19 g/l and a free sulfuric acid content of 3.56 wt %. The initial charge was 7.53 l of aqueous sodium hydroxide solution with an NaOH content of 320 g/l.

After an oxidation time of around 7 hours at 85° C. and after work-up of the aqueous suspension, an oxidation product was obtained which had the following data:

Specific surface area by BET method: 19.0 $m^2/g$
Fe content: 70.4 wt %
Al content: 0.01 wt %

This oxidation product was calcined at the optimum calcining temperature of 700° C. (accuracy ±5° C.) with a residence time of 30 minutes in an oxidizing atmosphere in a chamber kiln. For the determination of the optimum calcining temperature, a variety of temperatures were trialled (see Table 3).

The resulting non-inventive pigment without addition of Al was characterized—as indicated in Table 4—and tested coloristically in WorléeKyd P 151 (full shade) (for colorimetric values see Table 5).

The same red pigment was processed in HD-PE and, as described in Inventive Example 1, the heat stability was determined by measurement of the saturation $C_{ab}^*$ (see Table 6 and FIG. 1).

The inventive Al-containing pigments from Inventive Examples 1 (0.81% Al) and 2 (2.2% Al) represent high-grade Al-containing red iron oxide pigments having specific surface areas by the BET method in the range from 8.6 to 9.6 $m^2/g$ and they exhibit very high chemical purity, characterized by Mn and Cr contents of in total below 100 ppm, by Cl contents of below 250 ppm and by low $H_2O$ contents of less than 0.01 wt % (see Table 5).

Relative to the four prior-art red haematite pigments, the colorimetric values of the inventive Al-containing pigments in WorléeKyd P 151 (full shade) are significantly higher (see Table 5), thereby opening up new regions in the CIELAB colour space for red iron oxide pigments, specifically with:

$\Delta a^* = 0.7$ CIELAB unit $\Delta b^* = 5.2$ CIELAB units $\Delta C^* = 4.0$ CIELAB units At the same time, in comparison to the prior art, the inventive Al-containing red pigments are characterized by a significantly higher heat stability in HD-PE (as $\Delta C_{ab}^*$ values of 200 versus 320° C.; see Table 6) with a significantly higher saturation $C_{ab}^*$, specifically:

$\Delta C_{ab}^*$ (inventive) up to −1.3 CIELAB units as against $\Delta C_{ab}^*$ (prior art) of −1.7 to −2.3 CIELAB units $C_{ab}^*$ (inventive) up to 43.4 CIELAB units as against $\Delta C_{ab}^*$ (prior art) of up to 39.4 CIELAB units

Comparative Example II

The Al-doped pigment described in EP-A 1380542 with the Fe:Al ratio of 95:5 was reproduced in accordance with the data in the example there. While FIG. 4B of EP'542 does contain the values of a* and b* for this example at various temperatures, it does not include the precise method by which this colour data was determined. The pigment produced according to the example of EP'542 was measured in the same way as for the determination of the colour data of the inventive examples above.

For determination of the optimum calcining temperature, a variety of temperatures were trialled (see Table 3). In this case, as a further temperature relative to those of FIG. 4B from EP'542, 700° C. was tested as well, and emerged as being the optimum calcining temperature.

The noninventive pigment obtained was characterized—as indicated in Table 4—and tested coloristically in Worlée-Kyd P 151 (full shade) (for colorimetric values see Table 5).

In the test system of the present invention as well, the a* and b* values for the Fe:Al =95:5 system produced according to EP'542 are well outside the respective ranges of the invention.

Comparative Example III

Inventive Example 1 was repeated, but using MgO rather than NaOH as precipitant, in half the molar quantity in accordance with the divalent nature of Mg, as employed for the production of Al-doped iron oxide in Example 7 of EP-A-187331. Moreover, the initial charge, rather than the NaOH, was the Fe(II)/Fe(III)/Al(III) sulfate mixture, and the MgO precipitant was added to this initial charge likewise as described in EP'331. Accordingly, the differences of a different precipitant and a different sequence of addition were transposed from EP'331 to Inventive Example 1 of the invention.

The pigment produced was measured in analogy to the determination of colour data for the inventive examples above.

Figure 2:
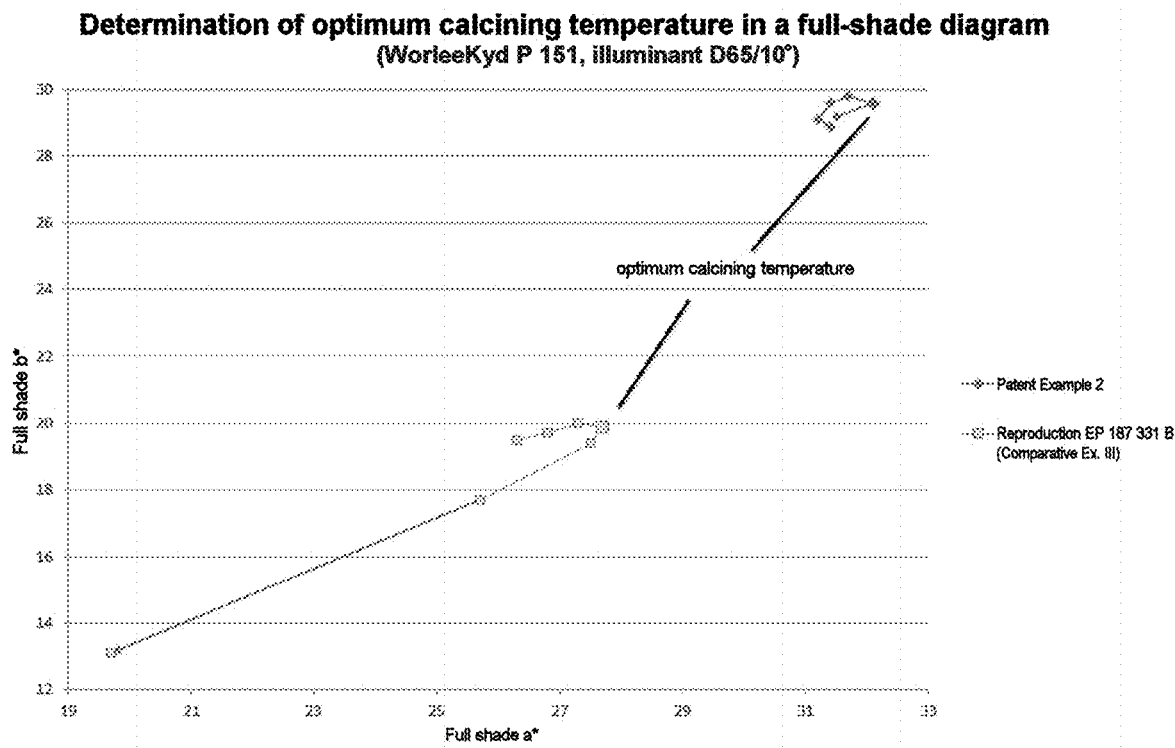
FIG. 2 shows a determination of optimum calcining temperature in a full-shade diagram.

For determination of the optimum calcining temperature, a variety of temperatures were trialled (see Table 3). A contrast with Inventive Example 2 is found in FIG. 2.

The noninventive pigment obtained was characterized—as indicated in Table 4—and tested coloristically in Worlée-Kyd P 151 (full shade) (for colorimetric values see Table 5).

In the present test system of the present invention as well, the a* and b* values for the Example 7 produced in analogy to EP'331 are well outside the respective ranges of the invention.

TABLE 2

Batch quantities for producing the oxidation products (step b)

| Examples Oxidation products | Batch quantities in mol | | | | | FeSO₄/ NaOH ratio |
|---|---|---|---|---|---|---|
| | $Me_{tot}$ | $Fe_{tot}$ | Fe(II) | Fe(III) | Al(III) | |
| Inventive Example 1 | 25 | 24.167 | 20.542 | 3.625 | 0.833 | 0.541 |
| Inventive Example 2 | 25 | 23.333 | 19.833 | 3.5 | 1.667 | 0.484 |
| Comparative Example I | 25 | 25 | 21.25 | 3.75 | 0 | 0.484 |

TABLE 3

Determination of the optimum calcining temperatures (colorimetric values in WorléeKyd P 151, full shade, illuminant D65/10°)

| Pigment | Calcining temperature [° C.] | Spec. surface area (BET)[m²/g] | Colour values, full shade | |
|---|---|---|---|---|
| | | | a* | b* |
| Inventive Example 1 | 700 | 13.9 | 26.1 | 23.9 |
| | 750 | 11.8 | 27.5 | 24.0 |
| | 775 | 8.6 | 31.9 | 25.9 |
| | 800 | 7.5 | 31.8 | 25.1 |
| | 825 | 5.7 | 30.7 | 22.4 |
| | 850 | 4.7 | 30.2 | 21.2 |
| | 900 | 3.0 | 25.2 | 14.0 |
| Inventive Example 2 | 700 | 14.2 | 31.4 | 28.9 |
| | 750 | 13.4 | 31.2 | 29.1 |
| | 800 | 11.8 | 31.4 | 29.6 |
| | 850 | 11.6 | 31.7 | 29.8 |
| | 900 | 9.6 | 32.1 | 29.6 |
| | 950 | 8.5 | 31.5 | 29.2 |
| Comparative Example I | 600 | 7.9 | 29.1 | 21.0 |
| | 650 | 7.1 | 29.8 | 21.1 |
| | 700 | 6.2 | 30.1 | 20.7 |
| | 750 | 5.7 | 30.0 | 20.0 |
| | 800 | 4.9 | 29.4 | 18.8 |
| Comparative Example II | 300 | 26.7 | 24.3 | 19.8 |
| | 500 | 20.4 | 25.8 | 20.5 |
| | 650 | 17.1 | 27.8 | 22.6 |
| | 700 | 14.9 | 28.1 | 22.9 |
| | 800 | 10.3 | 27.7 | 23.2 |
| | 1000 | 3.1 | 23.8 | 14.8 |

TABLE 3-continued

Determination of the optimum calcining temperatures (colorimetric values in WorléeKyd P 151, full shade, illuminant D65/10°)

| Pigment | Calcining temperature [° C.] | Spec. surface area (BET)[m²/g] | Colour values, full shade a* | b* |
|---|---|---|---|---|
| Comparative Example III | 650 | 21.1 | 26.3 | 19.5 |
| | 700 | 12.9 | 26.8 | 19.7 |
| | 750 | 11.3 | 27.3 | 20.0 |
| | 800 | 8.0 | 27.7 | 19.9 |
| | 850 | 5.9 | 27.5 | 19.4 |
| | 900 | 4.3 | 25.7 | 17.7 |
| | 950 | 2.4 | 19.7 | 13.1 |

The optimum calcining temperature is highlighted by bold text.

TABLE 4

Characterization of the pigments of the invention after calcining of the oxidation products

| Pigment | Optimum calcining temperature for the red pigment [° C.] | Specific surface area (BET) [m²/g] | Fe total [wt %] | Al [wt %] | X* | Mn [ppm] | Cr [ppm] | Cl [ppm] |
|---|---|---|---|---|---|---|---|---|
| Inventive Example 1 | 775 | 8.6 | 69 | 0.81 | 0.047 | <1 | 22 | 3 |
| Inventive Example 2 | 900 | 9.6 | 66 | 2.2 | 0.129 | 2.1 | 13 | 8 |
| Comparative Example I | 700 | 6.2 | 70.4 | <0.01 | <0.001 | n.d.** | n.d.** | n.d.** |
| Comparative Example II | 700 | 14.9 | n.d.** | 1.7*** | 0.1*** | n.d.** | n.d.** | n.d.** |
| Comparative Example III | 800 | 8.0 | 58.9 | 1.3 | 0.08 | 29** | n.d.** | n.d.** |

*in relation to $Fe_{2-x}Al_xO_3$,
**not determined
*** as per data from EP'542

TABLE 5

Colorimetric values in WorléeKyd P 151 (full shade, illuminant 065/10°)

| Pigments as per invention | a* | b* | $C_{ab}^*$ | Al contents [wt%] | x |
|---|---|---|---|---|---|
| Inventive Example 1 | 31.9 | 25.9 | 41.1 | 0.81 | 0.047 |
| Inventive Example 2 | 32.1 | 29.9 | 43.9 | 2.2 | 0.129 |
| Comparative Example I | 30.0 | 20.7 | 36.5 | <0.01 | <0.001 |
| Comparative Example II | 28.1 | 22.9 | 36.3 | 1.7*** | 0.1*** |
| Comparative Example Ill | 27.7 | 19.9 | 34.1 | 1.3 | 0.8 |
| Red pigments as per prior art | a* | b* | $C_{ab}^*$ | Al contents [wt%] | x |
| R1599 D | 31.4 | 24.5 | 39.9 | — | |
| Example 1 WO 2016/038152 | 31.1 | 24.7 | 39.6 | — | |
| Example 3 DE 102004/024013 Al | 31.3 | 23 | 38.8 | 1.0 | 0.059 |
| Example 1 DE 2836941 Al | 30.2 | 23 | 38 | 0.95 | 0.056 | as per data from EP'542

TABLE 6

Data for Fig. 1

| Processing temperature[° C.] | Inventive Example 1 $C_{ab}*$ | Inventive Example 2 $C_{ab}*$ | Comparative Example $C_{ab}*$ | R 1599D (Huntsman) $C_{ab}*$ | DE 2836941 A1 Example 1 $C_{ab}*$ |
|---|---|---|---|---|---|
| 200 | 38.9 | 43.2 | 34.3 | 38.8 | 39.4 |
| 220 | 39.2 | 43.3 | 34.7 | 38.9 | 39.3 |
| 240 | 39.3 | 43.4 | 35.1 | 38.6 | 39.1 |
| 260 | 39.3 | 43.1 | 34.8 | 38.4 | 38.6 |
| 280 | 39.2 | 42.9 | 34.4 | 38.1 | 37.9 |
| 300 | 39 | 42.2 | 33.6 | 37.5 | 37.6 |
| 320 | 38.9 | 41.9 | 33.2 | 37.1 | 37.1 |
| $\Delta C_{ab}*$ (for $\Delta T$ 200 to 320° C.) | ± 0 | -1.3 | -1.1 | -1.7 | -2.3 |

What is claimed is:

1. A process for producing aluminium-containing haematite pigments of formula
    $Fe_{2-x}Al_xO_3$ with x values from 0.01 to 0.25, wherein the pigments possess an a* value of 30.5 to 32.5 CIELAB units and a b* value of 25.5 to 30.5 CIELAB units, and Al-containing iron oxides have a saturation Cab* of 39.8 to 44.6 CIELAB units, measured in each case as full shade in the alkyd resin according to DIN EN ISO 787-25:2007, comprising at least the steps of a) precipitation, b) oxidation and c) calcination, wherein:
    a1) an aqueous solution comprising ions of iron, of sulfate and of aluminium, a molar ratio of iron ions to Al ions being 199:1 to 7:1, is reacted with sodium hydroxide NaOH, as an alkaline compound, with the aqueous solution comprising ions of iron, of sulfate and of aluminium being metered into an initial charge of the alkaline compound, or
    a2) an aqueous solution comprising ions of iron and of sulfate is reacted with sodium hydroxide NaOH, as an alkaline compound, and with at least one alkali metal aluminate aluminium compound, with the molar ratio of iron in the solution to aluminium in the aluminium compound being 199:1 to 7:1 and with the alkaline compound being introduced as an initial charge with the at least one alkali metal aluminate aluminium compound, and the aqueous solution comprising ions of iron and of sulfate being metered in,
    b) an aqueous suspension obtained after step a1) or a2) is oxidized in the presence of an oxidizing agent, and
    c) an oxidation product obtained after b) is calcined at a temperature of 500 to 1100° C. in an oxidizing atmosphere.

2. The process according to claim 1, wherein the aqueous solution comprising ions of iron, of sulfate and of aluminium in step a1) has an Fe(III) fraction of 5 to 30 mol %, based on a total amount of iron in the solution.

3. The process according to claim 1 comprising at least the steps of a) precipitation, b) oxidation and c) calcination, wherein:
    a1) an aqueous solution comprising ions of iron, of sulfate and of aluminium, the molar ratio of iron ions to Al ions being 199:1 to 7:1, is reacted with sodium hydroxide NaOH, as an alkaline compound, with the aqueous solution comprising ions of iron, of sulfate and of aluminium being metered into the initial charge of the alkaline compound in the form of its aqueous solution, or
    a2) an aqueous solution comprising ions of iron and of sulfate is reacted with sodium hydroxide NaOH, as an alkaline compound, and with an aluminium compound sodium aluminate, with the molar ratio of iron in the solution to aluminium in the aluminium compound being 199:1 to 7:1 and with the alkaline compound being introduced as an initial charge with an aluminium compound sodium aluminate solution, and the aqueous solution comprising ions of iron and of sulfate being metered in,
    b) an aqueous suspension obtained after step a1) or a2) is oxidized in the presence of an oxidizing agent, and
    c) an oxidation product obtained after b) is calcined at a temperature of 500 to 1100° C. in an oxidizing atmosphere.

4. A process for colouring of pastes, paints, plastics, paper and building materials, wherein the pigments of formula $Fe_{2-x}Al_xO_3$ with x values from 0.01 to 0.25 made by a process according to claim 1 are utilized.

* * * * *